United States Patent
Horikawa et al.

(10) Patent No.: US 9,944,536 B2
(45) Date of Patent: Apr. 17, 2018

(54) TITANIUM-TETRACHLORIDE MANUFACTURING METHOD

(71) Applicant: TOHO TITANIUM CO., LTD., Chigasaki-shi, Kanagawa (JP)

(72) Inventors: Matsuhide Horikawa, Chigasaki (JP); Seiichiro Tani, Chigasaki (JP); Ryota Horiguchi, Kanagawa (JP); Eiichi Fukasawa, Chigasaki (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 0 days.

(21) Appl. No.: 14/429,675

(22) PCT Filed: Mar. 6, 2014

(86) PCT No.: PCT/JP2014/055843
§ 371 (c)(1),
(2) Date: Mar. 19, 2015

(87) PCT Pub. No.: WO2014/136902
PCT Pub. Date: Sep. 12, 2014

(65) Prior Publication Data
US 2015/0368119 A1     Dec. 24, 2015

(30) Foreign Application Priority Data

Mar. 6, 2013   (JP) ................................. 2013-043935

(51) Int. Cl.
*C01G 23/02*     (2006.01)
(52) U.S. Cl.
CPC ................... *C01G 23/022* (2013.01)
(58) Field of Classification Search
CPC ............................................... C01G 23/022
(Continued)

(56) References Cited

U.S. PATENT DOCUMENTS 3,925,057 A * 12/1975 Fukushima ............... C22B 1/08
                                                    423/148
4,055,621 A * 10/1977 Okudaira ............... C01G 49/06
                                                    423/148
(Continued)

FOREIGN PATENT DOCUMENTS

JP        50114491 A    9/1975
JP        S52-114491 A  9/1975
(Continued)

OTHER PUBLICATIONS

International Search Report for International Application No. PCT/JP2014/055843 dated Jun. 2014.

(Continued)

*Primary Examiner* — Ngoc-Yen Nguyen
(74) *Attorney, Agent, or Firm* — Fitch, Even, Tabin & Flannery, LLP

(57) ABSTRACT

A technique is provided in which valuable material is recovered from solid recovered material generated during chlorinating process of titanium-containing raw material, and in particular, in which chlorine gas and titanium-containing raw material can be efficiently separated and recovered from the solid recovered material. The method for production of titanium tetrachloride includes: a chlorinating process in which titanium-containing raw material, coke and chlorine are reacted, a recovering process in which chlorine gas, titanium oxide and coke are recovered by treating solid recovered material which is byproduced during the chlorinating process, and a reusing process in which these recovered material are reused as raw material for the chlorinating process.

7 Claims, 3 Drawing Sheets

(58) Field of Classification Search
USPC .......................................... 423/492, 79, 69
See application file for complete search history.

(56) References Cited

U.S. PATENT DOCUMENTS

| | | | |
|---|---|---|---|
| 4,060,584 A | | 11/1977 | Hartmann et al. |
| 4,183,899 A | | 1/1980 | Bonsack |
| 4,279,871 A | * | 7/1981 | Bonsack ................ C01G 31/00 |
| | | | 423/240 R |
| 4,442,076 A | | 4/1984 | Bonsack |
| 4,619,815 A | * | 10/1986 | Robinson ................ C22B 1/10 |
| | | | 423/74 |
| 4,624,843 A | * | 11/1986 | Robinson ............... C01G 49/10 |
| | | | 423/148 |
| 5,276,257 A | * | 1/1994 | Diesen ...................... C07C 2/76 |
| | | | 585/407 |
| 2005/0025687 A1 | * | 2/2005 | Gomez ..................... C22B 3/02 |
| | | | 423/85 |
| 2006/0183958 A1 | * | 8/2006 | Breneman ............... A62D 3/33 |
| | | | 588/313 |
| 2011/0182787 A1 | | 7/2011 | Lu |

FOREIGN PATENT DOCUMENTS

| | | |
|---|---|---|
| JP | 53-082613 A | 7/1978 |
| JP | 62-007628 A | 7/1978 |
| JP | 54-035195 A | 3/1979 |
| JP | 60-500171 A | 2/1985 |
| JP | 02-026828 A | 1/1990 |
| JP | 2005-015250 A | 1/2005 |
| RU | 2470868 C2 | 12/2012 |
| SU | 276028 A1 | 7/1970 |
| SU | 461610 A1 | 3/1985 |
| WO | 84/01939 A1 | 5/1984 |

OTHER PUBLICATIONS

Office Action of Russian Appln. No. 2015111512/05(017971) dated Jan. 30, 2018 with English translation.

* cited by examiner

TITANIUM-TETRACHLORIDE MANUFACTURING METHOD

TECHNICAL FIELD

The present invention relates to a technique in which titanium tetrachloride is produced by chlorinating reaction of titanium-containing raw material, and in particular, relates to a technique in which byproduct in the chlorinating reaction and solid recovered material which are carried from a previous process (hereinafter referred to as "carried-over") can be efficiently reused.

BACKGROUND ART

Titanium tetrachloride, which is a primary raw material of titanium, is produced by chlorinating reaction of titanium-containing raw material. This chlorinating reaction accompanies byproduction of chlorides of impurities such as iron, manganese, and magnesium contained in the titanium-containing raw material.

In addition, when titanium-containing raw material is consumed and becomes a fine powder during a chlorinating reaction using chlorine gas and coke in the chlorinating furnace, it may be carried to a next process while being unreacted, and it may be recovered as a solid component.

Furthermore, there may be carried and recovered oxides such as silicon oxide in titanium-containing raw material that is minimally chlorinated and is.

Furthermore, although the amount of byproduct is small if high titanium-containing raw material having large content of titanium is used, such high titanium-containing raw material is now becoming expensive with increasing worldwide demand for titanium and titanium alloys, and procurement thereof is becoming progressively difficult.

In view of such circumstances, a technique is required in which titanium-containing raw material that is available at a lower price than high titanium-containing raw material but which byproduces more impurities, is used really well.

In a case in which titanium-containing raw material is chlorinated, there is a tendency that the amount of solid recovered material generated during chlorinating reaction of titanium-containing raw material increases as the grade of the ore decreases.

Under these circumstances, important matters of attention are, in addition to the chlorinating reaction of ore itself, how the solid recovered material primarily containing chlorides of impurity components byproduced in the chlorinating reaction of ore is handled.

Furthermore, a method for treating recovered material that is unreacted and carried from a previous process is also identified as a similar subject.

The solid recovered material containing byproduct and carried-over recovered material during chlorinating reaction of titanium-containing raw material is conventionally treated being of the wet type, and then it is separated into solid and liquid components by treating by filter press. The solid component is treated as waste material. On the other hand, the liquid component is made harmless by a treatment such as neutralizing, and it is discharged as waste in the public sewer system.

The solid recovered material is not desirable from the viewpoint of environmental impact, and there is room for improvement from this viewpoint.

Regarding treatment of solid recovered material of titanium-containing raw material, for example, Japanese Unexamined Patent Application Publication No. 2005-015250 discloses a technique in which chlorides of impurity components byproduced together with titanium tetrachloride during chlorinating reaction of titanium-containing raw material is reacted with scrap titanium at a high temperature so that chlorine in the chlorides of impurity components is moved to titanium and thereby recovering titanium as titanium tetrachloride.

However, in this technique, although a method for recycling chlorides in solid recovered material is disclosed, there is no disclosure regarding treatment method of solid material contained in solid recovered material, such as fine powder titanium-containing raw material and coke which are unreacted carried-over recovered material, silicon oxide, and the like.

Furthermore, Japanese Unexamined Patent Application Publication No. Hei 02(1990)-026828 discloses a technique in which titanium oxide is separated from raw material discharged from a chlorinating furnace by electrostatic beneficiation so as to reuse it in the chlorinating furnace.

However, there is no disclosure regarding technique to recycle chlorides of impurity materials byproduced in chlorinating reaction of titanium-containing raw material or unreacted carried-over recovered material.

Furthermore, Japanese Unexamined Patent Application Publication No. Sho 52(1977)-114491 discloses a technique in which chlorine gas is reacted with a mixture comprising metallic chlorides and solid residue byproduced in chlorinating reaction of titanium-containing raw material so that ferrous chloride contained in the residue is converted into gaseous ferric chloride and chlorine gas is recovered by oxidizing and roasting the ferric chloride gas.

However, there is no disclosure regarding treatment method of solid residue including recovered, unreacted, carried-over material remaining after the reaction, and there is room for researching from the viewpoint of reducing environmental impact.

As is explained, a technique is required in which not only chlorine gas, but also unreacted titanium-containing raw material and coke contained in solid recovered material, can be effectively recycled from the solid recovered material generated during processes for production of titanium tetrachloride by chlorinating reaction of titanium-containing raw material.

SUMMARY OF THE INVENTION

The present invention relates to a technique to recover valuable material from solid recovered material generated during chlorinating process of titanium-containing raw material, and in particular, an object of the present invention is to provide a technique in which chlorine gas and titanium-containing raw material can be efficiently separated and recovered from the solid recovered material.

The inventors have researched means for solving the above subjects in view of the above-mentioned circumstances, they found that solid recovered material generated during chlorinating process of titanium-containing raw material is heated to separate chlorides of impurity components contained in the solid recovered material as the form of gas and the gaseous chlorides are oxidized and roasted to recover chlorine gas so that the chlorine gas can be recycled as a chlorinating agent of titanium-containing raw material, and they also found that fine powder solid material which is carried over as unreacted material and remained in the solid recovered material is granulated so that it can be recycled as titanium raw material, and the present invention was completed.

That is, the method for production of titanium tetrachloride of the present invention includes: a chlorinating process in which titanium-containing raw material, coke and chlorine are reacted, a recovering process in which chlorine gas, titanium oxide and coke are recovered by treating solid recovered material which is byproduced during the chlorinating process, and a reusing process in which these recovered material are reused as raw material for the chlorinating process.

In the method for production of titanium tetrachloride of the present invention, it is desirable that in the recovering process, gaseous chlorides and fine powder solid component be separated by heating the solid recovered material, and the gaseous chlorides be recovered, oxidized and roasted so that chlorine gas is recovered from the chlorides.

In the method for production of titanium tetrachloride of the present invention, it is desirable that the chlorine gas recovered by the above means be used as a chlorinating agent for the raw material for production of titanium tetrachloride or titanium-containing raw material.

In the method for production of titanium tetrachloride of the present invention, it is desirable that the fine powder solid component remaining after separating the gaseous chlorides from the solid recovered material be granulated for use as a raw material for production of titanium tetrachloride.

In the method for production of titanium tetrachloride of the present invention, it is desirable that the fine powder solid component remaining after separating the gaseous chlorides from the solid recovered material be used as a heat source for the heating process.

In the method for production of titanium tetrachloride of the present invention, it is desirable that part of the fine powder solid component remaining after separating the gaseous chlorides from the solid recovered material, be combusted for use as a heat source for the heating process.

In the method for production of titanium tetrachloride of the present invention, it is desirable that the fine powder solid component remaining after separating the gaseous chlorides from the solid recovered material, be used as, a valuable raw material.

In the method for production of titanium tetrachloride of the present invention, it is desirable that titanium ore, which is contained in the fine powder solid component remaining after separating the gaseous chlorides from the solid recovered material, is reacted with chlorine gas to produce titanium tetrachloride.

In the method for production of titanium tetrachloride of the present invention, it is desirable that the granulated fine powder solid component be mixed with titanium-containing raw material and be recycled as raw material for production of titanium tetrachloride.

In the method for production of titanium tetrachloride of the present invention, it is desirable that the fine powder solid component remaining after separating the gaseous chlorides from the solid recovered material, be mixed with titanium-containing raw material, granulated together, and recycled as raw material for production of titanium tetrachloride.

In the above aspect in which the fine powder solid material and the titanium-containing raw material are granulated together, it is desirable that the titanium-containing raw material to be mixed correspond to one that is sifted and removed from a product in a particle size regulation process of ore for production of titanium tetrachloride and which is on the finer particle side in the particle size distribution.

In the method for production of titanium tetrachloride of the present invention, it is desirable that titanium oxide be one that is separated from raw material discharged from a chlorinating furnace for production of titanium tetrachloride.

According to the method of the present invention, not only chlorides of impurity components and unreacted titanium-containing raw material and coke, which are conventionally treated as solid recovered waste material, can be efficiently separated and recovered, but also the recovered chlorine, titanium-containing raw material and coke can be efficiently recycled as a raw material for titanium tetrachloride.

MODE FOR CARRYING OUT THE INVENTION

Figure 1:
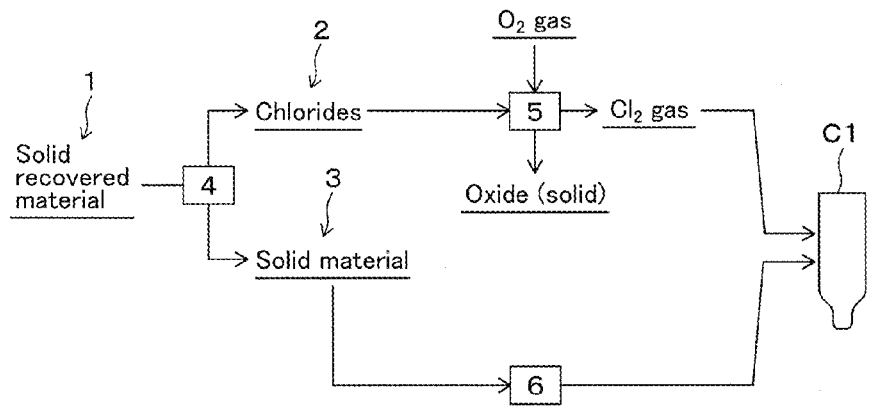
FIG. 1 is a conceptual diagram showing the first Embodiment of the present invention.

The best mode for carrying out the invention is further explained in detail as follows.

The present invention is a method for production of titanium tetrachloride by a chlorinating method, and it is characterized in that chlorine gas, titanium oxide and coke, which are generated by treating the solid recovered material byproduced during the chlorinating process, can be recycled as a raw material for production of titanium tetrachloride.

The chlorinating method herein means a method in which chlorine gas and coke are reacted with titanium-containing raw material containing titanium oxide for chlorinating the titanium-containing raw material so that titanium tetrachloride is produced.

Illustration of the chlorinating method itself is omitted. In the method, a conventional chlorinating furnace can be used, in which titanium-containing raw material and coke are supplied to an approximately cylindrical chlorinating furnace while heating, at the same time, chlorine gas is flowed into the chlorinating furnace while being dispersed from a dispersing base at the bottom of the chlorinating furnace so as to form a fluidized layer comprising the titanium-containing raw material, coke and chlorine, so that titanium tetrachloride is produced.

Titanium tetrachloride generated in the fluidized layer in the chlorinating furnace flows upward in the chlorinating furnace while in the form of a gas, and is moved to a recovering system via a pipe connected at the top part of the chlorinating furnace. The recovering system is cooled to not more than 136.4° C., which is the boiling point of titanium tetrachloride, and titanium tetrachloride is recovered in a liquid phase.

Since iron chloride byproduced in the chlorinating furnace has a boiling point higher than that of titanium tetrachloride, iron chloride gas having a temperature of 800 to 900° C. exhausted from the chlorinating furnace is cooled until about 300° C. so that the iron chloride can be separated and removed in a solid phase from titanium tetrachloride in the gas phase.

On the other hand, since silicon chloride has a lower boiling point than that of titanium tetrachloride, even in a case in which titanium tetrachloride gas contained in a gas exhausted from the chlorinating furnace is cooled to about 130° C. and recovered in a liquid phase, silicon chloride exists in a gas phase.

The "solid recovered material" which is an object of the present invention not only means a solid material including impure chlorides which are byproduced in a chlorinating reaction of so-called titanium-containing raw material, and coke and titanium-containing raw material which are carried over from the chlorinating furnace to the recovering system while being unreacted, but also means a raw material ore which is discharged from the chlorinating furnace at a predetermined interval.

The above impure chlorides contain various kinds of chloride which are generated by chlorinating various kinds of metal components other than titanium which are contained in titanium-containing raw material, and in particular, iron chloride, magnesium chloride and manganese chloride are the main components. Since the impure chlorides have low boiling point, they are carried with titanium tetrachloride both in gas phase to the recovering system that is downstream of the chlorinating process, and they are cooled so as to be separated and recovered in liquid or solid phase.

Furthermore, the solid material mainly contains unreacted coke and titanium-containing raw material. They are formed by being consumed during chlorinating reaction and becoming fine powder, they are carried in the gas flow of chlorine gas and titanium tetrachloride, and they are carried to the recovering system downstream of the chlorinating process while being unreacted, and they are separated and recovered as powder.

First Embodiment

The first Embodiment of the present invention is explained with reference to FIG. 1. In FIG. 1, the material name and material condition are underlined, and a square is added to an operation and a process performed to a material. First, in a solid recovered material 1 which is collected at a chlorinating furnace cooling and recovering system, various impure chlorides 2 other than titanium and unreacted fine powder solid material 3 are contained, and in particular, in the impure chlorides 2, iron chloride, magnesium chloride and manganese chloride are recovered as main components.

In the present invention, in a heating process 4 shown in FIG. 1, it is desirable that the solid recovered material 1 be heated to a high temperature not less than the boiling point of the impure chlorides 2 to vaporize chlorides 2 contained in the solid recovered material 1 so that the chlorides 2 and the solid component 3 contained in the solid recovered material 1 are separated.

In the present invention, the chloride gas 2 that is generated in the heating process 4 of the solid recovered material is continuously moved to an oxidizing and roasting process 5. In this process, oxygen gas is reacted with the chlorides gas 2. By performing the oxidizing and roasting process 5, impure oxides and chlorine gas are generated by reaction of the impure chlorides 2 and oxygen gas, and as a result, chlorine gas can be effectively recovered from the solid recovered material 1.

The chlorine gas recovered can be recycled in a chlorinating reaction of titanium-containing raw material in a chlorinating furnace C1 as shown in FIG. 1. Furthermore, this chlorine gas can also be used as a selective chlorinating agent that is used to a low-grade titanium ore so that only impurities (mainly iron) are chlorinated and removed as a chloride, without chlorinating titanium contained in the ore, It should be noted that since the impure oxides byproduced in the above oxidizing and roasting process 5 contains iron oxide, magnesium oxide and manganese oxide as main components, they can be effectively recycled as ceramic material, road base material, cement raw material or the like.

In the solid material 3 which is separated by the separating operation in the heating process 4, as is mentioned above, fine powders of unreacted titanium-containing raw material and coke which are flowed by gas flow of chlorine gas and titanium tetrachloride gas in the chlorinating process are mainly contained.

In the present invention, it is desirable that these unreacted titanium-containing raw material and coke, and the above solid material 3 are processed to be granulated in a granulating process 6. By processing the granulated body as mentioned above, it can be effectively recycled as a raw material of titanium tetrachloride.

In the present invention, it is desirable that the diameter of the granulated body of the solid material 3 be granulated in a range of 250 to 2000 μm.

In a case in which the solid material 3 not granulated is added and recycled in new raw material for chlorinating furnace for production of titanium tetrachloride, the material may be carried over by gas flow again; however, by granulating in the above range, carry-over loss from the chlorinating furnace in the case in which it is recycled can be efficiently controlled.

It is desirable that the granulated body used in the present invention have a certain strength in order to prevent it from being broken when supplied to the fluidized layer. In practice, a range of 100 $gf/mm^2$ to 5000 $gf/mm^2$ is desirable.

In the present invention, it is desirable that the granulated body be directly placed into the chlorinating furnace for production of titanium tetrachloride. For example, it can be introduced into the fluidized layer in the chlorinating furnace via a nozzle arranged at side part of the fluidized layer of the chlorinating furnace together with chlorine gas.

As a result, contact efficiency with chlorine gas is improved, and as a result, titanium tetrachloride can be efficiently produced.

As another Embodiment of the present invention, this unreacted titanium-containing raw material and coke can be supplied to the chlorinating furnace again as they are fine powder. This Embodiment can be accomplished by introducing the fine powder raw material into the fluidized layer which is formed in the chlorinating furnace C1 (FIG. 1), C3 (FIG. 2), or C4 (FIG. 3) while being dispersed in chlorine gas flow, for example.

By performing the above operation, the granulating process of the fine powder raw material can be omitted, and compared to a case in which the granulating process is performed, cost is further decreased.

Furthermore, as another desirable Embodiment, the solid material 3 which is separated in the separating operation in the heating process 4 is recycled in the heating process 4 as it is without performing the granulating process, so that coke contained in the recovered material can be used as a heat source of the heating process 4.

Second Embodiment

In the present invention, instead of the unreacted fine powder solid material 3 as raw material of the granulating body, a fine powder titanium-containing raw material that is generated in another route can be used. That is, in the present invention, fine powder titanium-containing raw material that is inevitably generated during preliminarily treatment of titanium-containing raw material for production of titanium tetrachloride and is recovered, and which is conventionally treated as a waste material, can be utilized.

Figure 2:
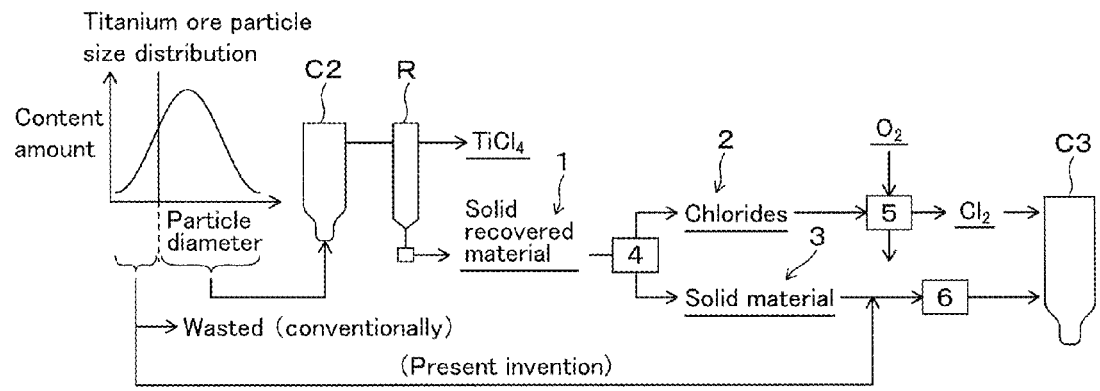
FIG. 2 is a conceptual diagram showing the second Embodiment of the present invention.

In a current production of titanium tetrachloride in which high titanium-containing raw material, titanium-containing raw material which is produced is broken and made into powder, this powder is sifted, and material which is coarser than a certain particle size, as is shown in graph of particle size distribution in FIG. 2, is used as a raw material of the chlorinating reaction.

Since titanium-containing raw material that is finer than a certain particle size may be carried in the gas flow and be carried from the chlorinating furnace to the recovering system while being unreacted and become waste material as mentioned above, it is not used in the chlorinating reaction, and it is rather wasted by being buried in a mine.

The second Embodiment of the present invention shown in FIG. 2 solves this problem. As shown in FIG. 2, coarser raw material is supplied to the chlorinating furnace C2 first so as to perform chlorinating reaction. Subsequently, titanium tetrachloride generated and inevitable impurities are moved to recovery system R, titanium tetrachloride in a gas phase is recovered from the top part of the recovery system R, and solid recovered material 1 is recovered from the bottom part.

A flowchart of recycling of the solid recovered material 1 shows that chlorine gas obtained from chlorides 2 of solid recovered material 1 and unreacted titanium-containing raw material and coke fine powder obtained from solid recovered material 3 are granulated in the granulating process 6 so as to be recycled in the chlorinating furnace C3 in the same manner as in the first Embodiment, and in addition, in the second Embodiment, raw material of powder finer in particle size distribution which has been conventionally wasted by sifting of titanium-containing raw material at the first step, is used together with the granulated bodies of solid material 3.

In the present invention, since the titanium-containing raw material at finer particles, which has conventionally been buried in mines, is granulated and added to granulated bodies of solid material 3, or since the titanium-containing raw material at finer particles is added to solid material 3 and granulated together, the fine powder of titanium-containing raw material can be recycled. In this way, titanium-containing raw material of finer particles, which has conventionally been buried in mines, can also be efficiently used.

In this Embodiment, the granulated bodies, which are produced as described above, can be roasted further so as to obtain titanium raw material. By preparing roasted granulated bodies as mentioned above, the granulated bodies can be prevented from being broken when supplied to the chlorinating furnace C3 for production of titanium tetrachloride. As a result, the amount that is carried over from the chlorinating furnace C3 before reaction with chlorine gas can be effectively reduced.

It should be noted that while the roasting process is performed after the granulating, process in the above explanation, the granulating process can be omitted and the fine powder raw material can be directly supplied to the chlorinating furnace C3 immediately after roasting.

Third Embodiment

Figure 3:
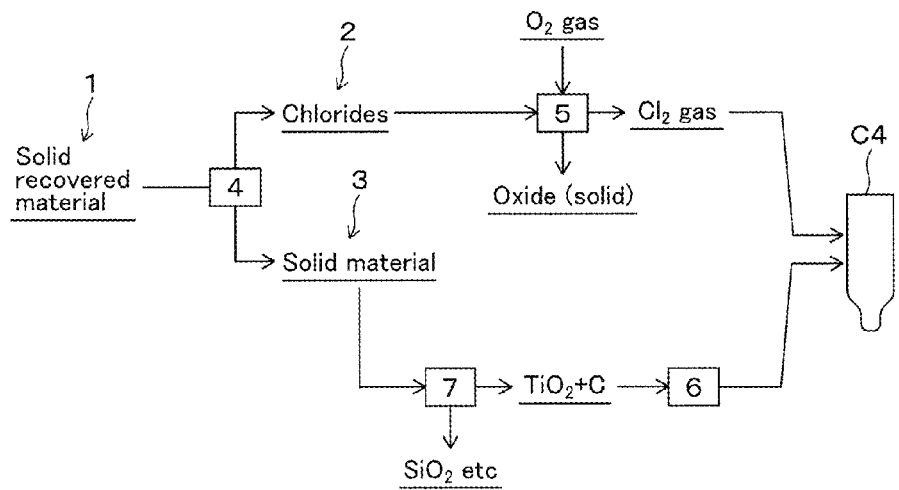
FIG. 3 is a conceptual diagram showing the third Embodiment of the present invention.

FIG. 3 shows the third Embodiment of the present invention. In the third Embodiment, it is desirable that the solid material 3 recovered from the solid recovered material 1 be introduced to electrostatic separating process 7. Since the other constituent elements are the same as in the first Embodiment, explanation thereof is omitted. By supplying the solid material 3 to the electrostatic separating process 7 before the granulating process 6, titanium-containing raw material and coke which are contained in the solid material 3 and are carried over from the chlorinating furnace, can be separated from other components (silicon chloride or the like) and be concentrated.

In the case of the first Embodiment, although content ratio of silicon oxide contained in the solid material 3 is low, and therefore, there is no problem in operating, since granulating of the solid material 3 is performed while the solid material 3 contains other components such as silicon oxide or the like, concentration of these other components may be increased by repeating recycling due to continuous supply of titanium-containing raw material, and thereby deteriorating reaction efficiency of chlorinating reaction.

On the other hand, by performing selection by the electrostatic separating process 7 in the third Embodiment as mentioned above, content amount of titanium-containing raw material and coke can be increased, and high grade raw material from which other components are removed can be supplied to the chlorinating furnace C4 so as to be used as raw material of titanium tetrachloride.

Fourth Embodiment

It is desirable that raw material which is discharged from the chlorinating furnace C5 for production of titanium tetrachloride is processed by the electrostatic separating process 7 in the fourth Embodiment. By performing the electrostatic separating process, content amount of titanium-containing raw material and coke can be increased, and high-grade solid material from which other components are removed can be prepared.

In a case in which size of the solid material having high concentration of titanium-containing raw material and coke is large enough, it can be reused as a raw material of titanium tetrachloride as it is.

With respect to fine powder solid material having low concentration, a granulated body having a certain grade can be produced by appropriately adding high-grade titanium-containing raw material.

Furthermore, in the case of solid material having low concentration of titanium-containing raw material, it is granulated to a certain size so as to use it as raw material for production of titanium tetrachloride.

In the present invention, it is desirable that particle size of the ore be granulated in a range of 250 μm to 2000 μm.

Furthermore, in the fourth Embodiment, by processing the raw material discharged from the chlorinating furnace in the electrostatic separating process 7, calcium chloride contained in the discharged material and not appropriate for raw material can also be separated effectively, and as a result, a phenomenon in which movement of fluidized layer is reduced by depositing calcium chloride in the chlorinating furnace can be efficiently controlled.

Fifth Embodiment

Figure 5:
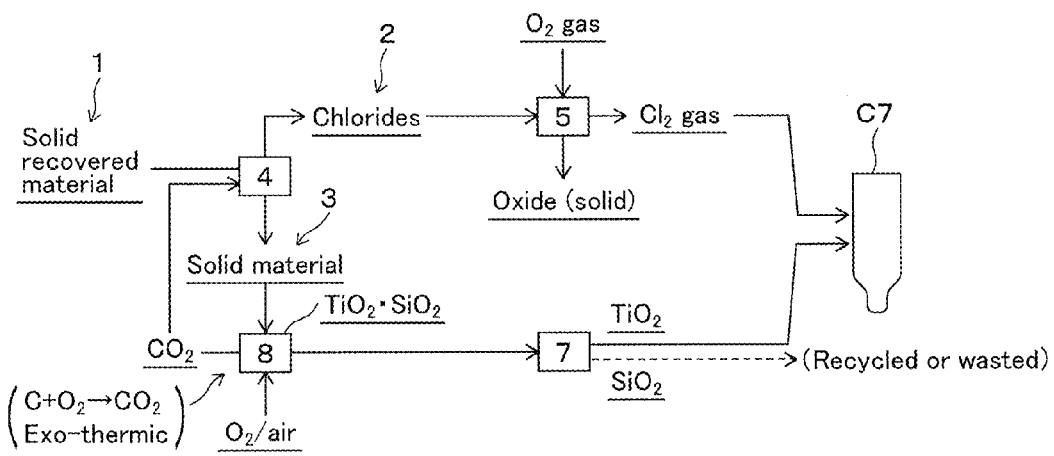
FIG. 5 is a conceptual diagram showing the fifth Embodiment of the present invention.

FIG. 5 shows the fifth Embodiment of the present invention. In this Embodiment, it is desirable that the solid material 3 separated in the heating process 4 be introduced to a roasting furnace 8 separately arranged, and coke contained in the solid material be roasted by adding oxygen gas or air in the roasting furnace 8. As a result, roasted residue containing titanium oxide and silicon oxide and not containing coke can be recovered from the solid recovered material.

It is desirable that the roasted residue in which titanium oxide and silicon oxide are contained and coke is removed by roasting is then processed in an electrostatic beneficiating device (electrostatic separating process 7). As a result, silicon oxide can be effectively removed from the roasted residue containing titanium oxide and silicon oxide, and roasted residue mainly containing titanium oxide can be supplied to a chlorinating furnace C7 as a raw material for production of titanium tetrachloride. This aspect greatly contributes to improvement in yield of titanium-containing raw material.

Furthermore, it is desirable that $CO_2$ gas generated in combustion reaction of coke occurred in the roasting furnace 8 be returned to the heating process 4 of the solid recovered material 3. As a result, heat of $CO_2$ gas can be used as a heat source of the heating process 4.

Sixth Embodiment

Figure 6:
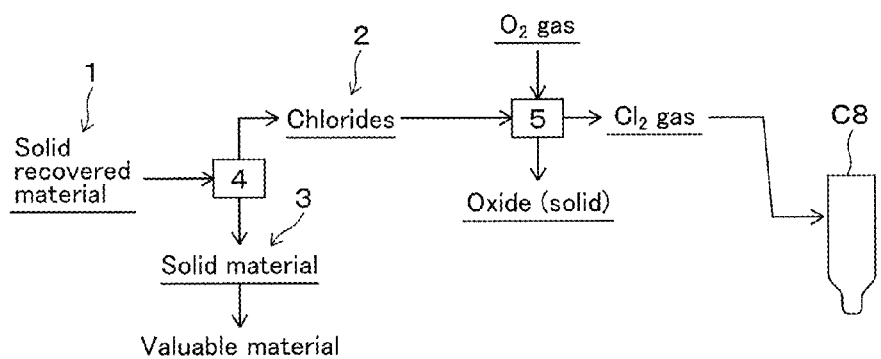
FIG. 6 is a conceptual diagram showing the sixth Embodiment of the present invention.

FIG. 6 shows the sixth Embodiment of the present invention. In this Embodiment, it is desirable that residue in the heating process 4 be used as a raw material for valuable material. The "valuable material" herein means combustion improving agent used in a cement roasting furnace or the like or raw material for road base material.

By making the valuable material from the residue, the material that has been conventionally processed as a waste material, incurring costs, can be sold as a valuable material in this Embodiment, and as a result, not only can waste material processing cost be reduced, but also sale profit can be obtained.

Seventh Embodiment

Figure 7:
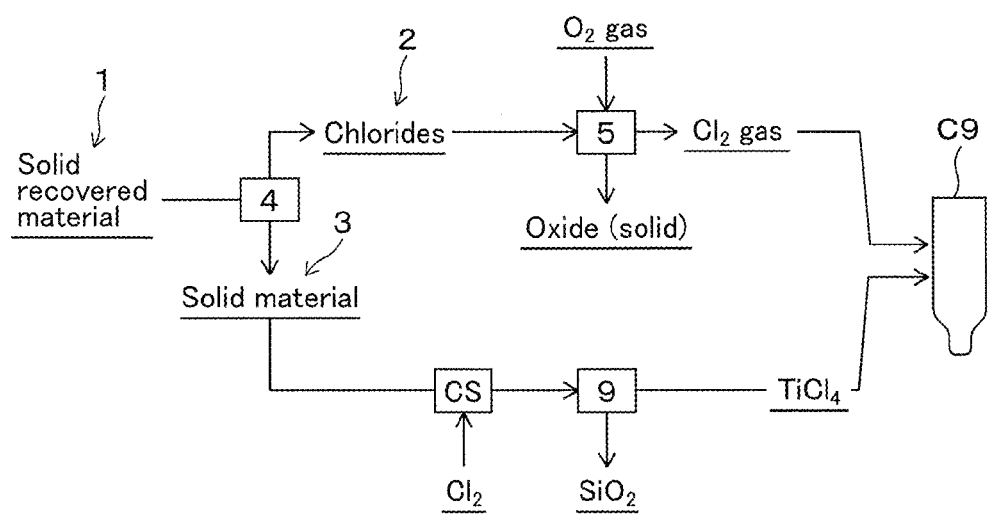
FIG. 7 is a conceptual diagram showing the seventh Embodiment of the present invention.

FIG. 7 shows the seventh Embodiment of the present invention, In this Embodiment, it is desirable that the solid material 3 recovered in the heating process 4 be introduced to a small chlorinating furnace CS to react with chlorine gas, titanium tetrachloride is generated by ore and coke contained in the solid material, and the titanium tetrachloride is introduced to a chlorinating furnace C9. As a result, yield on chlorinating of titanium ore can be effectively improved.

It should be noted that although titanium tetrachloride and silicon oxide as they are can be supplied to the chlorinating furnace C9 after the treatment in the small chlorinating furnace CS, the silicon oxide which did not participate in the chlorinating reaction in the small chlorinating furnace CS can be separated by a separating means such as cyclone 9 or the like for example and processed via another route as shown in FIG. 7.

As explained above, in the present invention, by processing the solid recovered material byproduced in the production process of titanium tetrachloride by kinds of methods, metallic components such as iron and silicon and chlorine component contained in the solid material can be recovered in the form of metal oxide and in the form of chlorine gas, respectively.

EXAMPLES

Hereinafter, the present invention is further explained in detail by way of Examples and Comparative Examples. The common conditions in Examples are as follows.

1) Solid Recovered Material
   Component: titanium-containing raw material, coke, impure chlorides
   Average particle diameter: 10 to 50 μm
2) Oxygen Gas
   Purity: 99.99%
   Formation: bottled gas
3) Heating Conditions of Solid Recovered Material
   Atmosphere: inert gas
   Temperature: 400 to 1000° C.
4) Oxidizing and Roasting of Chlorides
   Roasting temperature: 400 to 1000° C.
   Atmosphere: oxygen gas atmosphere
5) Granulating of Solid Component
   Temperature: room temperature
   Binder: water/liquid glass
   Target particle size: 250 μm to 2000 μm Example 1

Formation of FIG. 1

Solid recovered material 1 recovered in a cooling system of a chlorinating furnace for production of titanium tetrachloride was heated to a predetermined temperature so that chlorides 2 contained in the solid recovered material 1 was vaporized and separated. The material was subsequently heated up to 800° C. and contacted with oxygen gas so as to generate chlorine gas by oxidizing and roasting of the chlorides 2. Chlorine gas was introduced to the chlorinating furnace for production of titanium tetrachloride so that it is recycled as a chlorinating agent of titanium-containing raw material. On the other hand, solid component remained in the chlorinating and roasting of the solid recovered material 1 was granulated in a range of 250 μm to 2000 μm, so that it was recycled as titanium raw material of the chlorinating furnace for production of titanium tetrachloride. As a result, recovered ratio of chlorine gas and titanium-containing raw material was 80% and 95%, respectively. Furthermore, ore unit requirement, coke unit requirement, and chlorine unit requirement improved by recycling each recovered raw material for the chlorinating furnace for titanium chloride was 95%, 95%, and 98%, respectively, if each unit requirement was assumed as 100 in a case in which recycled raw material was not used.

Example 2

Formation of FIG. 2

Except that fine powder ore which was sifted and separated from ore used in the chlorinating furnace for production of titanium tetrachloride was mixed with the solid components 3 of Example 1 and granulated together in Example 1, recycling of raw material for the chlorinating furnace for production of titanium tetrachloride was performed in a manner similar to that in Example 1. As a result, coke unit requirement was further improved compared to Example 1, 68%.

Example 3

Figure 4:
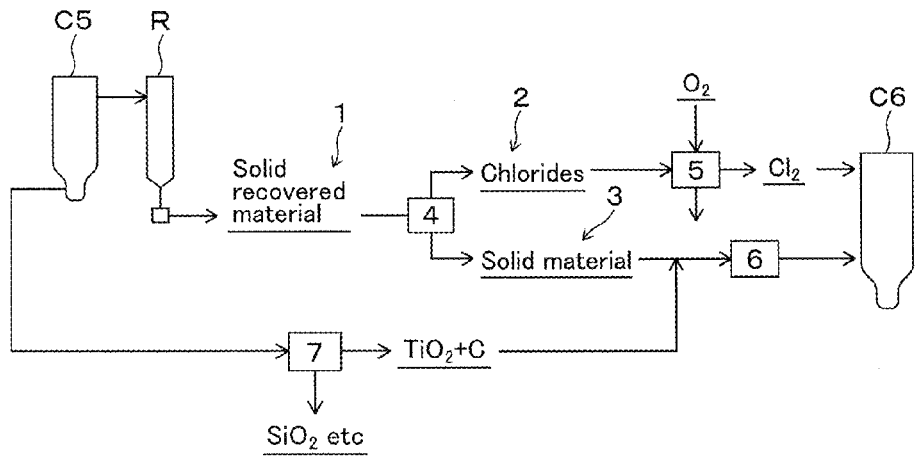
FIG. 4 is a conceptual diagram showing the fourth Embodiment of the present invention.

Formation of FIG. 4

In Example 1, raw material was discharged from the chlorinating furnace for production of titanium tetrachloride in order to control components in the furnace. The discharged raw material was processed in an electrostatic separator so as to separate titanium-containing raw material and coke from the discharged raw material. They were recycled in the chlorinating furnace for production of titanium tetrachloride. As a result, ore unit requirement and coke unit requirement were further improved compared to Example 1, both 93%.

Comparative Example 1

The solid recovered material 1 as it was in Example 1 was washed with water and neutralized so as to treat solid component and waste liquid. Loss of ore and chlorine gas during the process canceled out the improvement portion in Example 1. Furthermore, there were further costs for rendering the waste material harmless and for disposal.

The present invention can efficiently reduce the costs for production of titanium tetrachloride produced by using a chlorinating furnace for production of titanium tetrachloride, and environmental impact can be reduced.

EXPLANATION OF REFERENCE SYMBOLS

C: chlorinating furnace, R: recovering system, 1: solid recovered material, 2: impure chlorides, 3: fine powder solid material, 4: heating process, 5: oxidizing and roasting process, 6: granulating process, 7: electrostatic separating process, 8: roasting furnace, 9: cyclone

The invention claimed is:

1. A method for production of titanium tetrachloride, comprising:
    a) chlorinating a titanium-containing raw material with chlorine gas and coke to generate a product gas comprising titanium tetrachloride in a chlorinating furnace,
    b) passing the product gas comprising titanium tetrachloride to a recovery process to separate the titanium tetrachloride gas from a solid material containing impure chlorides byproduced during the chlorinating process, unreacted titanium oxide and unreacted coke,
    c) heating the separated solid material from step b) to obtain gaseous impure chlorides and fine powder solid components containing the unreacted titanium oxide and unreacted coke,
    d) roasting the gaseous impure chlorides so that chlorine gas is recovered,
    e) reusing at least part of the fine powder solid components from step c) and chlorine gas from step d) as raw materials for production of titanium tetrachloride, wherein for step e), the at least part of the fine powder solid components is granulated to have a strength in order to prevent it from being broken when supplied to the production of titanium tetrachloride, the strength being in a range of 100 to 5000 gf/mm$^2$,
    f) discharging a mixture comprising a portion of the titanium-containing raw material, a portion of the coke and other impurities from the chlorinating furnace during the chlorinating step a),
    g) separating the titanium-containing raw material and coke from other impurities in the removed mixture by using an electrostatic separation process, resulting in upgrading of the titanium-containing raw material and coke contents, and
    h) reusing the upgraded titanium-containing raw material and coke for the production of titanium tetrachloride as it is, or while adding it to the fine powder solid components recovered from the gaseous impure chlorides of step c).

2. The method for production of titanium tetrachloride according to claim 1, wherein part of the fine powder solid components of step c) is combusted to use as a heat source for a heating process.

3. The method for production of titanium tetrachloride according to claim 1, wherein for step e), part of the fine powder solid components is mixed with titanium-containing raw material, granulated together, and recycled as raw material for production of titanium tetrachloride.

4. The method for production of titanium tetrachloride according to claim 3, wherein the titanium-containing raw material to be mixed corresponds to one that is on the finer side in particle size distribution of the titanium-containing raw material and is sifted and removed from a granulating process.

5. The method for production of titanium tetrachloride according to claim 1, wherein part of the fine powder solid component of step c) is directly introduced into a fluidized layer inside of a chlorinating furnace for production of titanium tetrachloride.

6. A method for production of titanium tetrachloride, comprising:
    a) chlorinating a titanium-containing raw material with chlorine gas and coke to generate a product gas comprising titanium tetrachloride in a chlorinating furnace,
    b) passing the product gas comprising titanium tetrachloride to a recovery process to separate titanium tetrachloride gas from a solid material containing impure chlorides, unreacted titanium oxide and unreacted coke generated during the chlorinating process,
    c) heating the solid material obtained from step b) to obtain gaseous impure chlorides and fine powder solid components containing the unreacted titanium oxide and unreacted coke,
    d) roasting the gaseous impure chlorides so that chlorine gas is recovered,
    e) upgrading a content of titanium-containing raw material and coke in the fine powder solid components of step c) by using an electrostatic separation process, and
    f) reusing the fine powder solid components having an upgraded content of titanium-containing raw material and coke from the electrostatic separating process from step e) and the chlorine gas from step d) for the production of titanium tetrachloride,
    wherein for step f), the part of the fine powder solid components having an upgraded content of titanium-containing raw material and coke of step e) is granulated to prevent a powderization before being used in the process of titanium tetrachloride production, to preserve a strength in a range of 100 to 5000 gf/mm$^2$.

7. A method for production of titanium tetrachloride, comprising:
    a) chlorinating a titanium-containing raw material with chlorine gas and coke to generate a product gas comprising titanium tetrachloride in a chlorinating furnace,
    b) passing the product gas comprising titanium telrachloride to a recovery process to separate titanium tetrachloride gas from a solid material containing impure chlorides, unreacted titanium oxide and unreacted coke generated during the chlorinating process,
    c) heating the separated solid material from step b) to obtain gaseous impure chlorides and fine powder solid components containing the unreacted titanium oxide and unreacted coke,
    d) roasting the gaseous impure chlorides so that chlorine gas is recovered, e) roasting the fine powder solid components obtained from step c) so as to remove the coke,
f) upgrading a content amount of titanium-containing raw material in the fine powder solid components after step e) by using an electrostatic separating process, and
g) reusing the fine powder solid components from which the coke has been removed and having an upgraded content of titanium-containing raw material from step f) and chlorine gas from step c) for the production of titanium tetrachloride.

* * * * *